(12) United States Patent
De Meerschman et al.

(10) Patent No.: US 10,710,709 B2
(45) Date of Patent: Jul. 14, 2020

(54) MECHANICAL SYSTEM FOR TRANSMITTING MOTION AND AN AIRCRAFT FITTED WITH A CORRESPONDING SYSTEM

(71) Applicant: AIRBUS HELICOPTERS, Marignane (FR)

(72) Inventors: Olivier De Meerschman, Lambesc (FR); Matthias Gatti, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 498 days.

(21) Appl. No.: 15/700,423

(22) Filed: Sep. 11, 2017

(65) Prior Publication Data
US 2018/0072407 A1 Mar. 15, 2018

(30) Foreign Application Priority Data
Sep. 9, 2016 (FR) ...................... 16 01331

(51) Int. Cl.
*B64C 27/14* (2006.01)
*B64C 27/12* (2006.01)

(52) U.S. Cl.
CPC .............. *B64C 27/14* (2013.01); *B64C 27/12* (2013.01); *B64C 2027/125* (2013.01)

(58) Field of Classification Search
CPC .... B64C 27/14; B64C 27/12; B64C 2027/125
See application file for complete search history.

(56) References Cited

U.S. PATENT DOCUMENTS 6,302,356 B1  10/2001  Hawkins

FOREIGN PATENT DOCUMENTS

| DE | 1003597 B | 2/1957 |
| EP | 0078111 A2 | 5/1983 |
| WO | 2011100499 A1 | 8/2011 |

OTHER PUBLICATIONS

French Search Report for French Application No. FR 1601331, Completed by the French Patent office dated Jul. 10, 2017, 7 Pages.

*Primary Examiner* — Jessica B Wong
(74) *Attorney, Agent, or Firm* — Brooks Kushman P.C.

(57) ABSTRACT

A mechanical system for transmitting rotary motion between at least two shafts movable in rotation respectively about a first axis and a second axis, the first and second axes intersecting, the mechanical system including a bevel gear set made up of a first bevel gear having teeth and movable in rotation about the first axis and a bevel wheel having teeth and movable in rotation about the second axis, the teeth of the first bevel gear and of the bevel wheel respectively being suitable for co-operating in complementary manner with one another, the first bevel gear, referred to as a "power" gear, presenting a first defining pitch surface of conical shape, and the bevel wheel presenting a second defining pitch surface of conical shape.

12 Claims, 3 Drawing Sheets

MECHANICAL SYSTEM FOR TRANSMITTING MOTION AND AN AIRCRAFT FITTED WITH A CORRESPONDING SYSTEM

CROSS-REFERENCE TO RELATED APPLICATIONS

This application claims priority to French patent application No. FR 16 01331 filed on Sep. 9, 2016, the disclosure of which is incorporated in its entirety by reference herein.

BACKGROUND OF THE INVENTION

(1) Field of the Invention

The present invention relates to the field of means for transmitting rotary motion between at least two shafts.

More particularly, the invention relates to a mechanical system including a bevel gear set in a main drivetrain for transmitting driving torque and an additional accessory gear co-operating with a bevel wheel of the bevel gear set.

(2) Description of Related Art

In known manner, mechanical systems of this type are designed to limit slip and wear between the various teeth of each of the gears and the bevel wheel. In order to guarantee such a result, the respective axes of rotation must necessarily be arranged relative to one another so that all three of them intersect at a point. Furthermore, such mechanical systems are described in particular in the following documents: DE 1 003 597, WO 2011/100499, and U.S. Pat. No. 6,302,356.

Nevertheless, enabling all three axes of rotation to coincide puts a constraint on the diameter and/or on the number of teeth and/or on the orientation of the axis of the accessory gear co-operating with the teeth of the bevel wheel of the gear set. It is then not possible to arrange for the transmission to have the desired reduction ration directly, and it is necessary to use additional means for reducing the speed of rotation of the gear and/or, potentially, additional angle transmissions in order to modify the orientation of a transmission shaft driven in rotation by the accessory gear.

Such mechanical systems then have a large number of parts or mechanical members or parts, which can be troublesome, in particular in terms of total weight and cost.

BRIEF SUMMARY OF THE INVENTION

An object of the present invention is thus to provide a mechanical system making it possible to be unaffected by the above-mentioned limitations. Such a mechanical system thus goes against the theory normally used by the person skilled in the art for designing bevel gear sets, but it makes it possible to limit weight and cost very significantly, while nevertheless not compromising long life and reliability.

The invention thus provides a mechanical system for transmitting rotary motion between at least two shafts movable in rotation respectively about a first axis and a second axis, the first and second axes intersecting. Such a mechanical system includes a bevel gear set made up of a first bevel gear having teeth movable in rotation about the first axis and a bevel wheel having teeth movable in rotation about the second axis, the respective teeth of the first bevel gear and of the bevel wheel being suitable for co-operating in complementary manner with one another. The first bevel gear, referred to as a "power" gear, presents a first defining pitch surface of conical shape, while the bevel wheel presents a second defining pitch surface of conical shape.

The intersecting first and second axes are then relatively positioned so as to define, during meshing between the power gear and the bevel wheel, a first operating pitch surface of conical shape relating to the power gear and a second operating pitch surface of conical shape relating to the bevel wheel, the first and second operating pitch surfaces being defined respectively by a common vertex S arranged at the intersection between the first and second axes and by a circle corresponding to one of the respective pitch circles of the power gear and of the bevel wheel. By definition, such first and second operating pitch surfaces roll on each other without slip during the operation of such a bevel gear set.

Furthermore, the pitch circles are formed respectively by tangential circles, the circles also being centered on the first and second axes, or in other words these tangential circles are inscribed in planes that are perpendicular respectively to the first and second axes. Such pitch circles then present pitch diameters of ratio equal to the ratio between the number of teeth of the power gear and the number of teeth of the bevel wheel.

Furthermore, the first operating pitch surface is selected to be identical to the first defining pitch surface and the second operating pitch surface is selected to be identical to the second defining pitch surface.

The mechanical system also includes another bevel gear, referred to as the "accessory" gear, having teeth meshing with the teeth of the bevel wheel in order to transmit rotary motion to a third shaft that is movable in rotation about a third axis, the accessory gear presenting a third defining pitch surface of conical shape.

The mechanical system is remarkable in that the accessory gear presents a third operating pitch surface obtained by the second and third axes being relatively positioned so as to enable the accessory gear to mesh with the bevel wheel, the third operating pitch surface of the accessory gear being selected to be different from the third defining pitch surface of the accessory gear, the third operating pitch surface being defined firstly by a third vertex S' arranged at an intersection between the third axis and the second axis and secondly by a pitch circle of the accessory gear, the third vertex S' being separate from the common vertex S.

In other words, the bevel wheel presents two different operating pitch surfaces. The second operating pitch surface is defined by the meshing between the teeth of the bevel wheel and the teeth of the power gear, and a fourth operating pitch surface is defined by the meshing between the teeth of the bevel wheel and the teeth of the accessory gear. In both situations, the two operating pitch surfaces in a given set roll on each other without slip.

Furthermore, the third axis about which the accessory gear rotates does not intersect the first and second axes. As mentioned above, such a particular arrangement is not optimized for transmitting maximum torque and therefore goes against the prejudice of the person skilled in the art when designing such a mechanical system having both a bevel gear set and an additional accessory gear. Nevertheless, such a limitation is not troublesome since the power consumed by the members driven in rotation via the accessory gear is much less than the power consumed by the members driven in rotation by the bevel wheel. For example, the power consumed by the members driven in rotation by the accessory gear may be less than or equal to 10% of the power consumed by the members driven in rotation by the bevel wheel.

Naturally, the power gear, the bevel wheel, and the accessory gear may have respective different numbers of teeth, e.g. so as to reduce the speed of rotation of the outlet shaft from the mechanical system, and more precisely between the first and third axes of rotation of such a mechanical system.

Advantageously, the conical shape of the third defining pitch surface may be defined by a fourth vertex S″ and by a defining half-angle $\delta_{def}$ at the fourth vertex S″, the third operating pitch surface presenting an operating half-angle $\delta_{fonc}$ at the third vertex S′, the defining half-angle $\delta_{def}$ being different from the operating half-angle $\delta_{fonc}$.

Under such circumstances, the third defining pitch surface of the accessory gear is then tangential to the second defining pitch surface of the bevel wheel.

In practice, the defining half-angle $\delta_{def}$ and the operating half-angle $\delta_{fonc}$ present a difference having an absolute value that may lie in the range 1° to 60°.

Specifically, such a value for the absolute value difference is appropriate for optimizing the angular positioning of the accessory gear and makes it possible to achieve a speed reduction ratio directly without requiring an additional speed reduction member.

More particularly, the defining half-angle $\delta_{def}$ and the operating half-angle $\delta_{fonc}$ present a difference having an absolute value that preferably lies in the range 10° to 60°.

According to an advantageous characteristic of the invention, each of the teeth of the accessory gear may present a plurality of cross sections of mutually different shapes, the plurality of cross sections being arranged in respective section planes P, P′ oriented substantially perpendicularly relative to the third axis. Consequently, the section planes P, P′ are oriented perpendicularly to a longitudinal direction in which each tooth extends.

In other words, the shape of the section of each tooth may vary along its length. Such an arrangement makes it possible specifically to adapt the relative positioning of the contact surfaces between the teeth of the bevel wheel and the teeth of the accessory gear, in particular as a function of the relative positioning between the second and third axes.

Advantageously, each of the teeth of the accessory gear has an outer top land, and at least in the outer top land each tooth may present top widths $e_1$, $e_2$ measured in respective section planes P, P′ oriented substantially perpendicularly relative to the third axis, which top widths $e_1$, $e_2$ vary with varying distance between the measurement plane and the fourth vertex S″.

In other words, the profile of the teeth of the accessory gear may taper or flare in the top lands of the teeth on going towards the fourth vertex S.

In practice, the first and second axes may be orthogonal.

Alternatively, or in addition, the second and third axes may also be orthogonal.

Finally, according to another advantageous characteristic of the invention, the first and third axes may be parallel.

Specifically, such an arrangement may present an advantage in simplifying the design of the drivetrain of a machine or of a vehicle having such a mechanical system for transmitting rotary motion fitted thereto.

Furthermore, in a first embodiment of the invention, the first, second, and third axes may be coplanar. Such an arrangement may also be advantageous for simplifying the design of the drivetrain for transmitting rotary motion between the various axes.

In a second embodiment of the invention, the first, second, and third axes may be non-coplanar. Under such circumstances, the mechanical transmission system then also makes it possible to modify the angular orientation of the third axis in a distinct manner relative to a plane defined by the first and third axes.

Consequently, the present invention also provides an aircraft including at least one engine and at least one rotor for providing the aircraft with propulsion and/or lift.

According invention, the aircraft is remarkable in that it includes at least one mechanical system as described above, the mechanical system serving to transmit rotary motion between a driveshaft of the engine(s) and a driven shaft of the rotor(s).

BRIEF DESCRIPTION OF THE DRAWINGS

The invention and its advantages appear in greater detail in the context of the following description of embodiments given by way of illustration and with reference to the accompanying figures, in which.

Elements that are present in more than one of the figures are given the same references in each of them.

DETAILED DESCRIPTION OF THE INVENTION

As mentioned above, the invention relates to a mechanical system and to an aircraft fitted with such a mechanical system.

Figure 1:
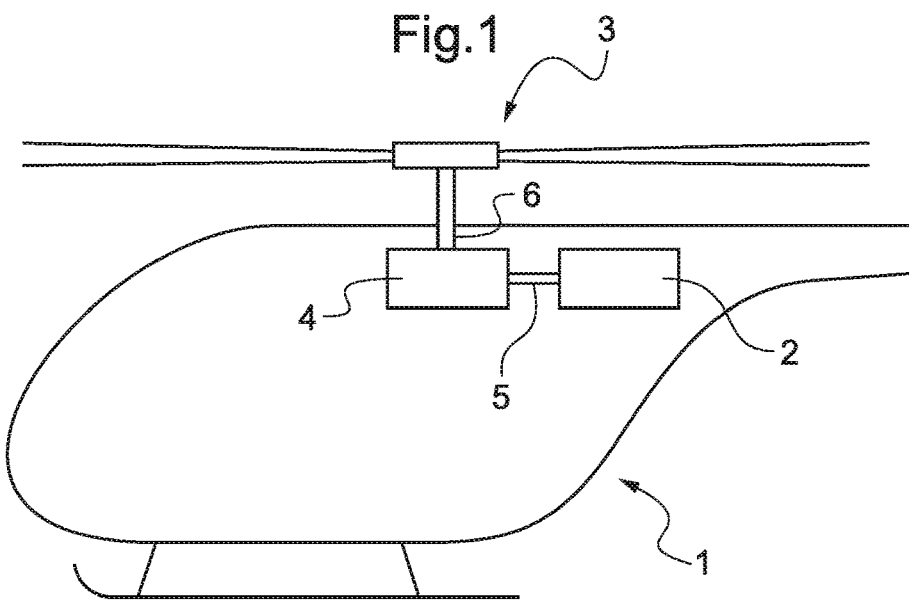
FIG. 1 is a perspective view of an aircraft fitted with a mechanical system in accordance with the invention.

As shown in FIG. 1, the aircraft 1 may be in the form of a rotorcraft and may have an engine 2 such as an internal combustion engine or indeed a turbojet. The engine 2 then serves to drive rotation of a drive shaft 5, and the mechanical system 4 serves to transmit rotary motion from the drive shaft 5 to a driven shaft 6 with a change to the angular orientations of the respective axes of rotation of the drive and driven shafts 5 and 6.

Such a driven shaft 6 can then drive rotation of at least one rotor 3 having blades for providing the aircraft 1 with lift and/or propulsion. Advantageously, a mechanical system 4 can also serve to reduce the speed of rotation of the driven shaft 6 relative to the speed of rotation of the drive shaft 5.

Figure 2:
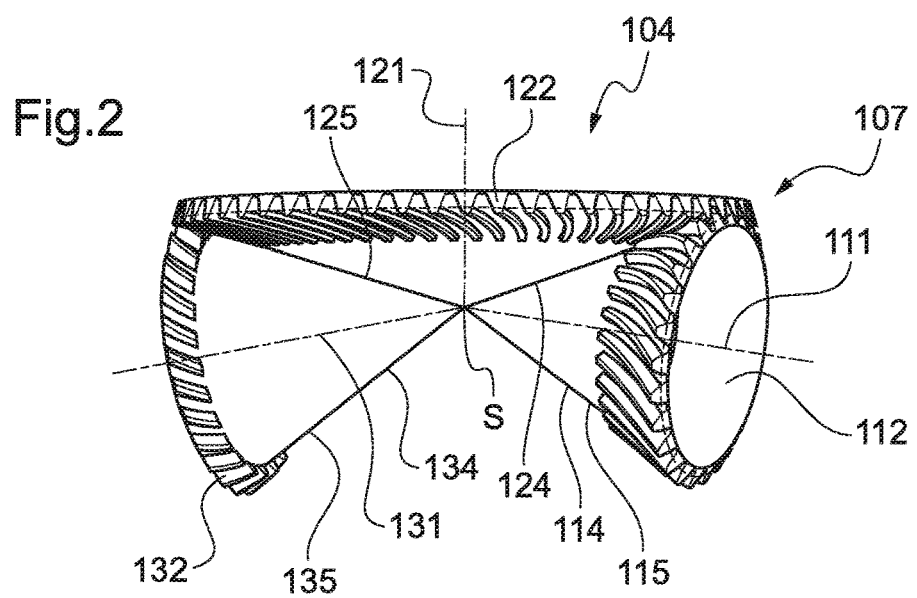
FIG. 2 is a theoretical perspective view showing the operation of a prior art mechanical system.

In the prior art, and as shown in FIG. 2, a mechanical system 104 may include a bevel gear set 107 comprising a first bevel gear 112 that is movable in rotation about a first axis 111, and a bevel wheel 122 that is movable in rotation about a second axis 121. Also, such a mechanical system 104 may also include a second bevel gear 132 driven in rotation by the bevel wheel 122, the second bevel gear 132 being movable in rotation about a third axis 131.

Under such circumstances, the theory that makes it possible to cause the teeth of the second bevel gear 132 to co-operate in complementary manner with the teeth of the bevel wheel 122 requires designers of this type of mechanical system 104 to cause all three axes 111, 121, and 131 to coincide at the vertex S.

Consequently, the respective defining pitch surfaces 114, 134, and 124 of the first and second bevel gears 112 and 132 and of the bevel wheel 122 then coincide with the respective operating pitch surfaces 115, 125, and 135 of the first and second bevel gears 112 and 132, and of the bevel wheel 122.

Figure 3:
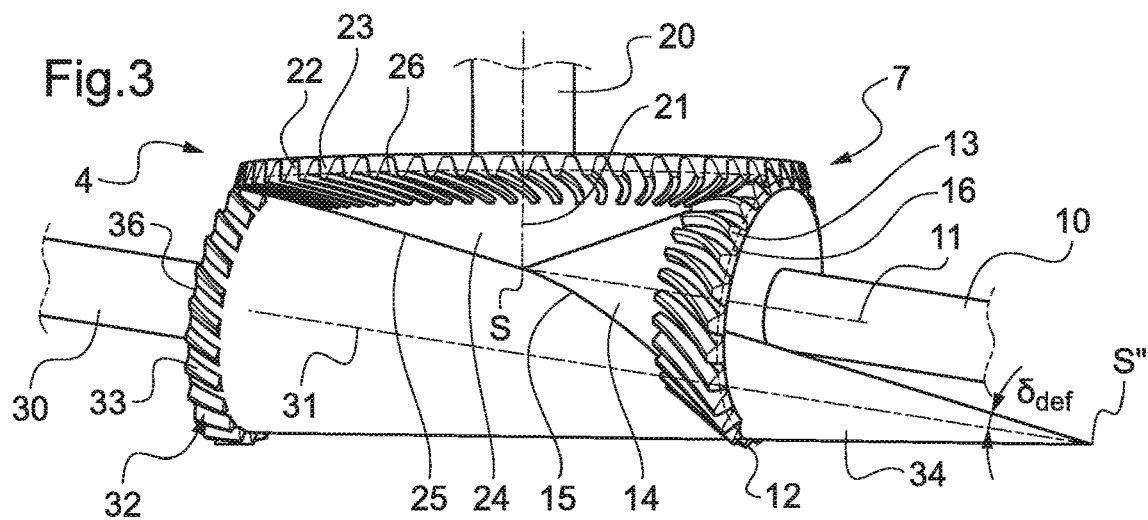
FIGS. 3 to 5 are various theoretical perspective views showing the operation of a first embodiment of a mechanical system in accordance with the invention having axes that are coplanar.
Figure 4:
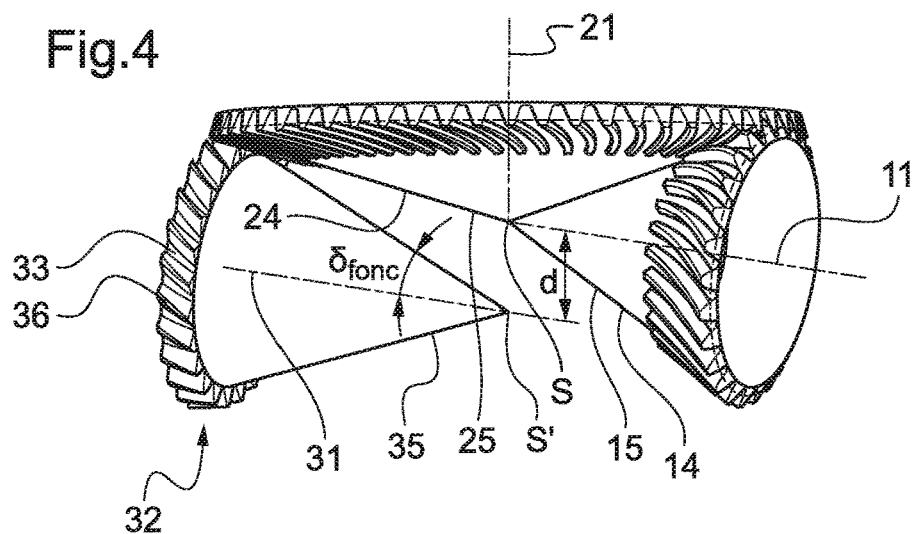
Figure 5:
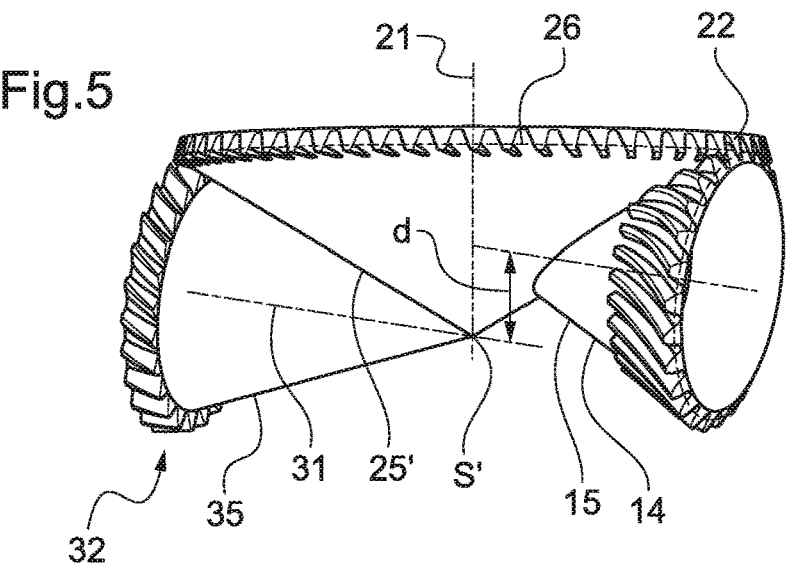

As shown in FIGS. 3 to 5, in a first embodiment, the mechanical transmission system 4 enables rotary motion to be transmitted between a first shaft 10 and a second shaft 20. The shafts 10 and 20 are movable in rotation about respective first and second mutually intersecting axes 11 and 21.

The mechanical system 4 has a bevel gear set 7 including a first bevel gear 12, referred to as the "power" gear, and that has teeth 13. Such a power gear 12 is then movable in rotation about a first axis 11. The bevel gear set 7 then also has a bevel wheel 22 that has teeth 23. The bevel wheel 22 is movable in rotation about a second axis 21.

The respective teeth 13 and 23 of the first power gear 12 and of the bevel wheel 22 may be of straight shape or of helical shape, and they are suitable for co-operating in complementary manner with one another. Also, the power gear 12 presents a first defining pitch surface 14 of conical shape while the bevel wheel 12 presents a second defining pitch surface 24 of conical shape.

A relative positioning of the intersecting first and second axes 11 and 21 then makes it possible during meshing between the power gear 12 and the bevel wheel 22 to define a first operating pitch surface 15 of conical shape relating to the power gear 12 and a second operating pitch surface 25 of conical shape relating to the bevel wheel 22.

Such first and second operating pitch surfaces 15 and 25 are defined respectively by a common vertex S arranged at the intersection between the first and second axes 11 and 21, and by a circle corresponding to one of the respective pitch circles 16 and 26 of the power gear 12 and of the bevel wheel 22.

Furthermore, the mechanical system 4 includes a second bevel gear 32, referred to as an "accessory" gear, having teeth 33 meshing with the teeth 23 of the bevel wheel 22 in order to transmit rotary motion to a third shaft 30 that is movable in rotation about a third axis 31. In this first embodiment of the mechanical system 4, such first, second, and third axes 11, 21, and 31 are arranged so as to be coplanar relative to one another.

As shown in FIG. 3, such an accessory gear 32 then also has a third defining pitch surface 34 that is conical in shape. Such a third defining pitch surface 34 is more particularly a cone that is tangential to the second defining pitch surface 24 relating to the bevel wheel 22. Such a third defining pitch surface 34 then presents symmetry of revolution about the third axis 31.

In addition, and as shown in FIG. 4, such an accessory gear 32 presents a third operating pitch surface 35 obtained by the second and third axes 21 and 31 being relatively positioned so as to enable the accessory gear 32 to mesh with the bevel wheel 22. The third axis 31 then no longer intersects simultaneously with the first and second axes 11 and 21 at the vertex S.

Consequently, and unlike the prior art, this third operating pitch surface 35 of the accessory gear 32 is then selected to be different from the third defining pitch surface 34 of the accessory gear 32. This third operating pitch surface 35 is defined firstly by a third vertex S' arranged at an intersection between the third axis 31 and the second axis 21, and secondly by a pitch circle 36 of the accessory gear 32.

The third defining pitch surface 34 is also defined by a fourth vertex S''' and by a defining a half-angle $\delta_{def}$ at the fourth vertex S'''. Furthermore, the third operating pitch surface 35 present an operating half-angle $\delta_{fonc}$ at the third vertex S'. The defining half-angle $\delta_{def}$ is then different from the operating half-angle $\delta_{fonc}$. The absolute value of the difference between the defining half-angle $\delta_{def}$ and the operating half-angle $\delta_{fonc}$ may then lie in the range 1° to 60°, and preferably the range 10° to 60°.

As shown in FIG. 5, the relative positioning between the second and third axes 21 and 31 then makes it possible, while the bevel wheel 22 and the accessory gear 32 are meshing, to define a fourth operating pitch surface 25' of conical shape relating to the bevel wheel 22 and the third operating pitch surface 35 of conical shape relating to the accessory gear 32.

This fourth operating pitch surface 25 is defined firstly by a third vertex S' arranged at an intersection between the third axis 31 and the second axis 21, and secondly by a pitch circle 26 of the accessory gear 22.

The second operating pitch surface 25 of the bevel wheel is then different from the fourth operating pitch surface 25'.

As a result, the third vertex S' is separate from the common vertex S with a distance $\underline{d}$ then lying between the common vertex S and the third vertex S'. Such a distance $\underline{d}$ is oriented along the second axis 21.

Figure 6:
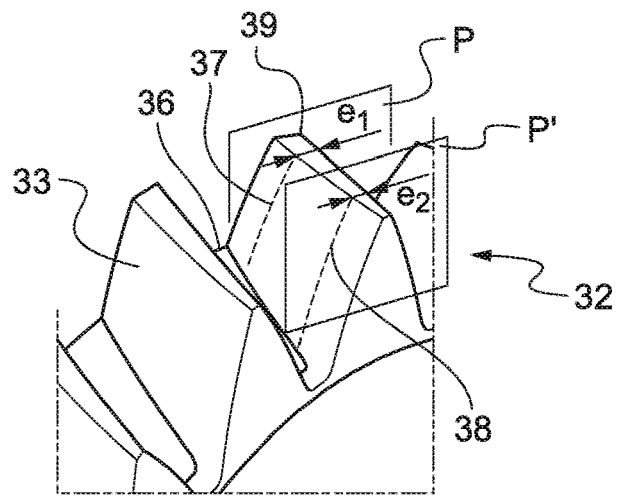
FIG. 6 is a perspective detail view showing the teeth of an accessory gear of a mechanical system in accordance with the invention.

As shown in FIG. 6, each of the teeth 33 of the accessory gear 32 presents a plurality of cross sections 37 and 38 of mutually different shapes. The cross sections 37 and 38 of this plurality are also arranged in respective section planes P, P' that are oriented substantially perpendicularly relative to the third axis 31.

Finally, at least at the level of an outer top land 39 of the various teeth 33 of the accessory gear 32, each tooth 33 presents a land width $e_1$, $e_2$ measured in a respective section plane P, P' oriented substantially perpendicularly relative to the third axis 31. As shown, this land width $e_1$, $e_2$ may then decrease the closer the section plane P, P' is to the fourth vertex S''' so as to make it possible to optimize the contact area between the teeth 33 of the accessory gear 32 and the teeth 23 of the bevel wheel 22.

Naturally, in another variant that is not shown, this land width $e_1$, $e_2$ could alternatively increase the closer the section plane P, P' is to the fourth vertex S'''.

Figure 7:
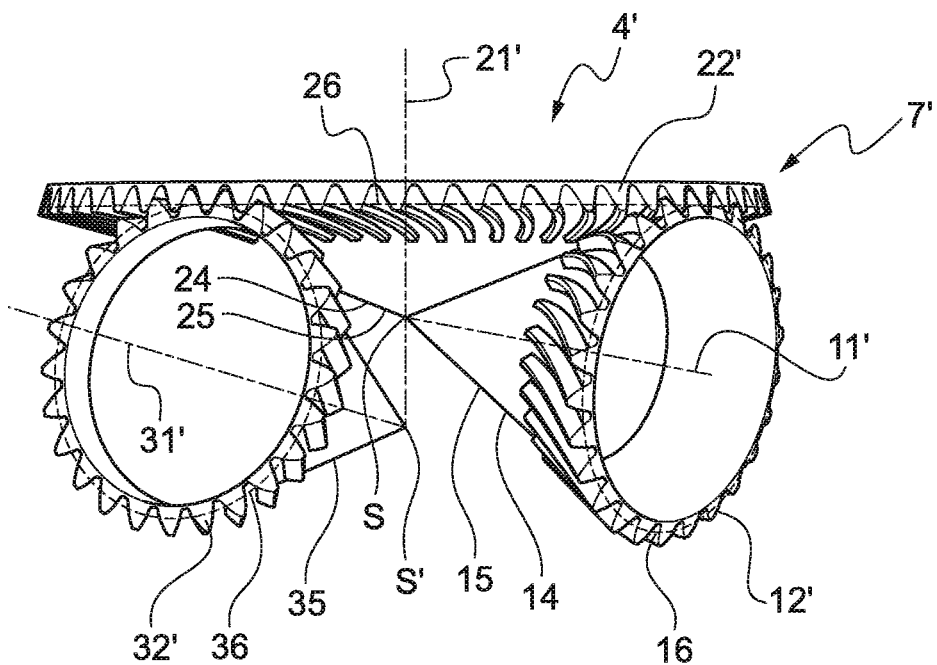
FIG. 7 is a theoretical perspective view showing the operation of a second embodiment of a mechanical system in accordance invention having axes that are not coplanar.

As shown in FIG. 7, a second embodiment of the mechanical transmission system 4' has a bevel gear set 7' including a power gear 12'. Such a power gear 12' is then movable in rotation about a first axis 11'. The bevel gear set 7' then also includes a bevel wheel 22'. The bevel wheel 22' is movable in rotation about a second axis 21'.

Such a mechanical system 4' also includes an accessory gear 32' driven in rotation by the bevel wheel 22', such an accessory gear 32' being movable in rotation about a third axis 31'.

As shown, the first, second, and third axes 11', 21', and 31' are arranged in mutually non-coplanar manner and thus allow the angular orientation of the rotary motion transmitted by such a mechanical system 4' to be modified.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A mechanical system for transmitting rotary motion between at least two shafts movable in rotation respectively about a first axis and a second axis, the first and second axes intersecting, the mechanical system including a bevel gear set made up of a first bevel gear having teeth and movable in rotation about the first axis and a bevel wheel having teeth and movable in rotation about the second axis, the teeth of the first bevel gear and of the bevel wheel respectively being suitable for co-operating in complementary manner with one another, the first bevel gear, referred to as a "power" gear, presenting a first defining pitch surface of conical shape, and the bevel wheel presenting a second defining pitch surface of conical shape, the intersecting first and second axes being relatively positioned so as to define, during meshing between the power gear and the bevel wheel, a first operating pitch surface of conical shape relating to the power gear and a second operating pitch surface of conical shape relating to the bevel wheel, the first and second operating pitch surfaces being defined respectively by a common vertex arranged at the intersection between the first and second axes and by a circle corresponding to one of the respective pitch circles of the power gear and of the bevel wheel, the pitch circles being formed respectively by tangential circles centered on the first and second axes, the first operating pitch surface being selected to be identical to the first defining pitch surface and the second operating pitch surface being selected to be identical to the second defining pitch surface, the mechanical system including another bevel gear, referred to as an "accessory" gear, having teeth meshing with the teeth of the bevel wheel to transmit rotary motion to a third shaft movable in rotation about a third axis, the accessory gear presenting a third defining pitch surface of conical shape;

wherein the accessory gear presents a third operating pitch surface obtained by the second and third axes being relatively positioned so as to enable the accessory gear to mesh with the bevel wheel, the third operating pitch surface of the accessory gear being selected to be different from the third defining pitch surface of the accessory gear, the third operating pitch surface being defined firstly by a third vertex arranged at an intersection between the third axis and the second axis and secondly by a pitch circle of the accessory gear, the third vertex being separate from the common vertex.

2. The mechanical system according to claim 1;
wherein the conical shape of the third defining pitch surface is defined by a fourth vertex and by a defining half-angle $\delta_{def}$ at the fourth vertex, the third operating pitch surface presenting an operating half-angle $\delta_{fonc}$ at the third vertex, the defining half-angle $\delta_{def}$ being different from the operating half-angle $\delta_{fonc}$.

3. The mechanical system according to claim 2;
wherein the defining half-angle $\delta_{def}$ and the operating half-angle $\delta_{fonc}$ present a difference having an absolute value lying in the range 1° to 60°.

4. The mechanical system according to claim 3;
wherein the absolute value of the difference between the defining half-angle $\delta_{def}$ and the operating half-angle $\delta_{fonc}$ preferably lies in the range 10° to 60°.

5. The mechanical system according to claim 1;
wherein each of the teeth of the accessory gear presents a plurality of cross sections of mutually different shapes, the plurality of cross sections being arranged in respective section planes oriented substantially perpendicularly to the third axis.

6. The mechanical system according to claim 5;
wherein each of the teeth of the accessory gear has an outer top land, and at least in the outer top land each tooth presents top widths measured in respective section planes oriented substantially perpendicularly relative to the third axis, which top widths vary with varying distance between the section plane in question and the fourth vertex.

7. The mechanical system according to claim 1;
wherein the first and second axes are orthogonal.

8. The mechanical system according to claim 1;
wherein the second and third axes are orthogonal.

9. The mechanical system according to claim 1;
wherein the first and third axes are parallel.

10. The mechanical system according to claim 1;
wherein the first, second, and third axes are coplanar.

11. The mechanical system according to claim 1;
wherein the first, second, and third axes are not coplanar.

12. An aircraft including at least one engine and at least one rotor for providing the aircraft with propulsion and/or lift;
wherein the aircraft includes at least one mechanical system according to claim 1, the mechanical system enabling rotary motion to be transmitted between a drive shaft of the at least one engine and a driven shaft of the at least one rotor.

* * * * *